April 23, 1963 O. ŠTOURAČ 3,086,231
CONTROL DEVICE FOR SOLE-ATTACHING MACHINES
Filed Sept. 7, 1960 5 Sheets-Sheet 1

INVENTOR
Oldřich Štourač
BY Richard Low
  ag't

April 23, 1963  O. ŠTOURAČ  3,086,231
CONTROL DEVICE FOR SOLE-ATTACHING MACHINES
Filed Sept. 7, 1960  5 Sheets-Sheet 2

INVENTOR
Oldřich Štourač
BY

April 23, 1963     O. ŠTOURAČ     3,086,231
CONTROL DEVICE FOR SOLE-ATTACHING MACHINES
Filed Sept. 7, 1960     5 Sheets-Sheet 3

INVENTOR
Oldřich Štourač

April 23, 1963  O. ŠTOURAČ  3,086,231
CONTROL DEVICE FOR SOLE-ATTACHING MACHINES
Filed Sept. 7, 1960  5 Sheets-Sheet 4

INVENTOR.
Oldřich Štourač
BY

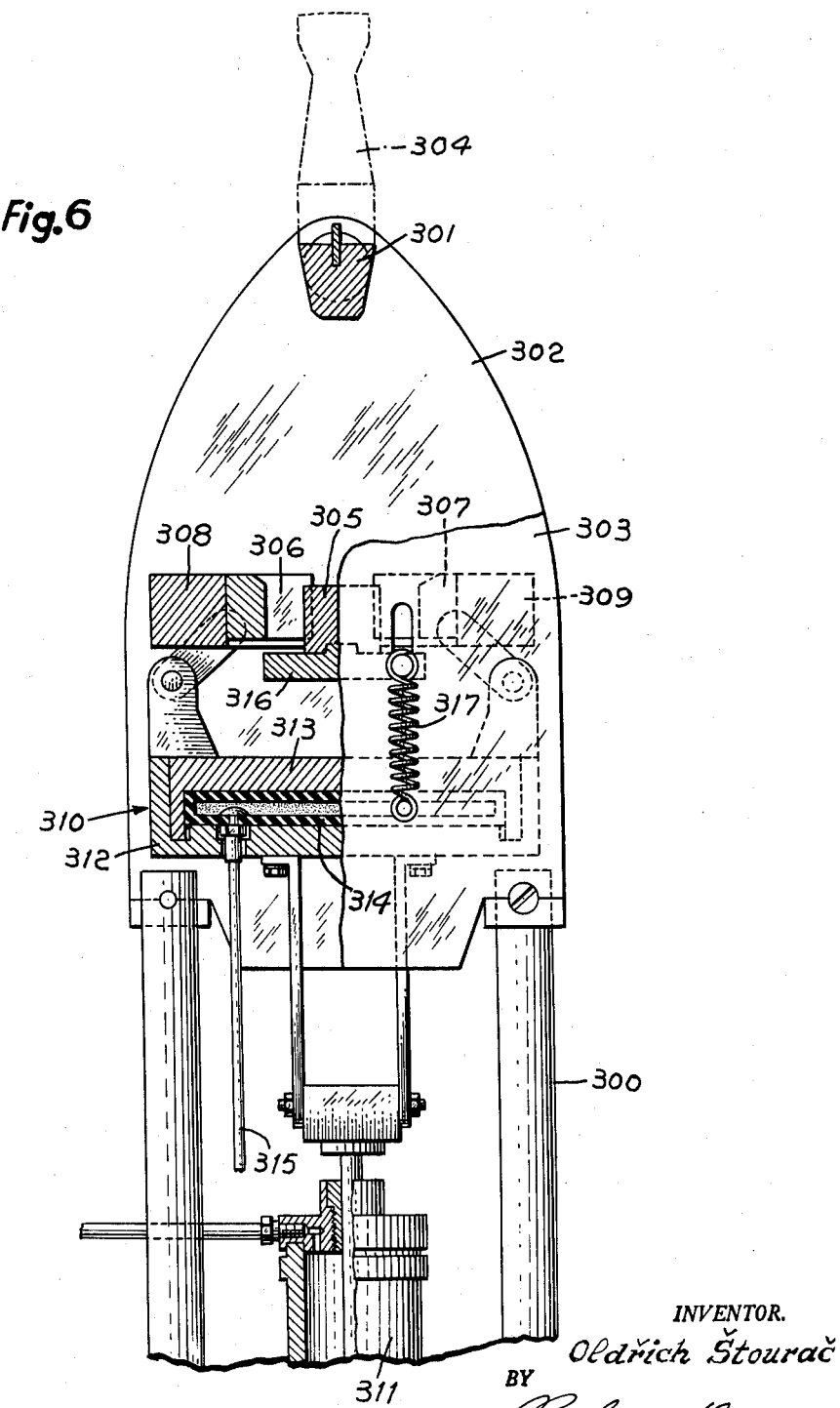

United States Patent Office 3,086,231
Patented Apr. 23, 1963

3,086,231
CONTROL DEVICE FOR SOLE-ATTACHING MACHINES
Oldřich Štourač, Gottwaldov, Czechoslovakia, assignor to SVIT, Gottwaldov, Czechoslovakia
Filed Sept. 7, 1960, Ser. No. 54,466
Claims priority, application Czechoslovakia Sept. 9, 1959
4 Claims. (Cl. 12—33.2)

The present invention relates to automatic control apparatus and more particularly to a device for automatically controlling the operation of a machine, which automatically attaches soles, such as rubber soles, to shoe uppers made of leather, textile or other material. Such a machine has been disclosed in the commonly assigned co-pending application of Josef Novotny et al., Serial Number 760,222, filed on September 10, 1958, now Patent No. 2,987,738.

In known machines for attaching soles to uppers, the various operational steps are carried out mostly by hand. This mode of operation requires a considerable effort on the part of the operator, in particular on machines with a plurality of work stations. In such machines it is difficult to detect failure in the heater or in another part of a work station, and losses in production inevitably result. In the known machines the desired productivity, accuracy and quality of the products cannot be achieved because of the manual controls.

The present invention aims at removing the aforesaid shortcomings by providing automatic means for controlling all operations of the machine after the machine has been started by means of a push-button.

The control device according to the invention comprises electric apparatus accommodated in a housing placed outside the sole attaching machine or directly on the machine, and connected to the machine for effecting automatic operation of the working units of the machine according to a predetermined program.

In order that the invention may be clearly understood and readily carried into effect, a preferred embodiment thereof will now be described with reference to the accompanying drawings, in which:

FIG. 6 is a fragmentary sectional elevation of the machine of FIG. 4 taken substantially on line VI—VI in FIG. 5.

Figure 4:
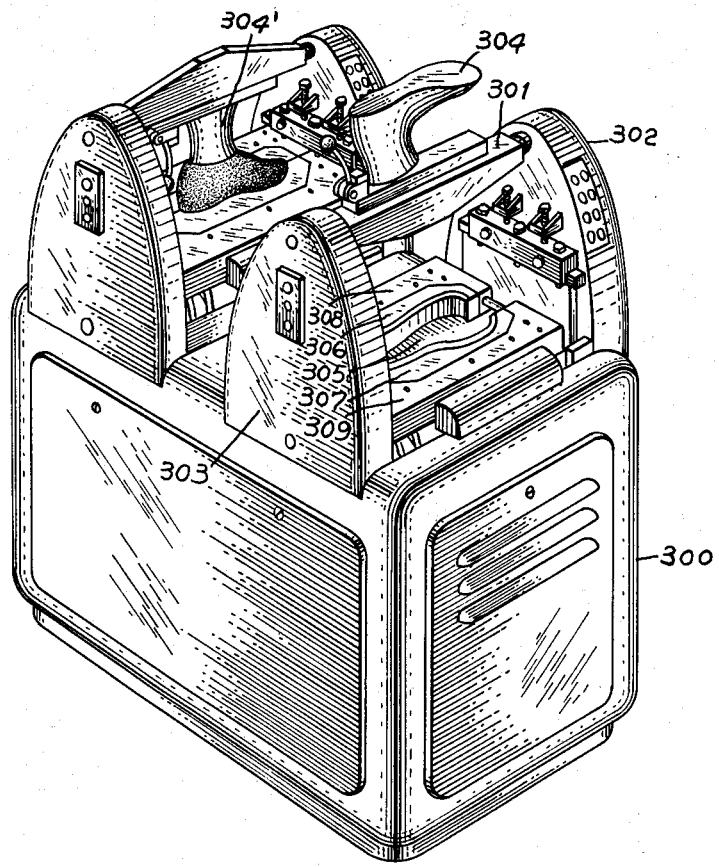
FIG. 4 shows the sole attaching machine in a perspective view.
Figure 5:
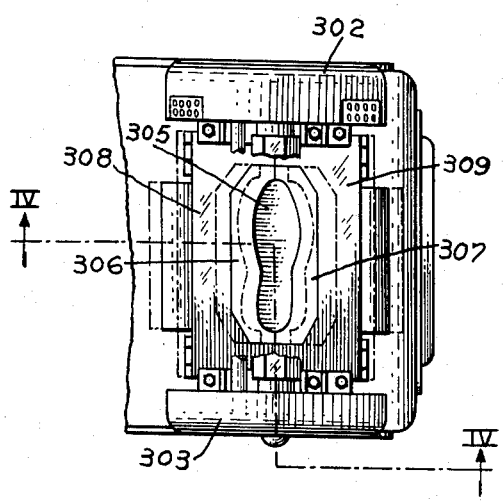
FIG. 5 illustrates a detail of the machine of FIG. 4 in plan view.

Referring now to the drawing in detail, and initially to FIGS. 4 to 6, there is shown the sole attaching machine disclosed in more detail in the afore-mentioned Patent No. 2,987,738.

The machine includes a plurality of work stations of which two are seen in FIG. 4. The work stations may be arranged in a straight row or in a circle, and may be mounted for linear or rotary movement toward and away from the operator's fixed position.

As shown in FIG. 4 the machine includes a supporting housing 300 which encloses the drive elements and may also enclose the control apparatus. A front wall 303 and a rear wall 302 of the work station proper extend upward from the housing 300 and are connected by a rotatable cross beam 301 which carries a releasably mounted presser foot 304. The presser foot is equipped with internal electric heaters to which current is fed from a current supply within the housing 300 by means of contact brushes and rings to be discussed in more detail hereinafter.

Rotation of the beam 301 by a pneumatic actuator moves the presser foot between the inoperative position shown at 304 and the operative position seen at 304' in which a mold cavity is substantially closed about the foot. The mold consists essentially of a plunger 305 the top face of which constitutes the bottom of the mold, and of two jaws 306 and 307 which are moved toward and away from each other in a horizontal plane by side pressure members 308 and 309.

The mold is supported on a table 310 seen in FIG. 6, the vertical movements of which are actuated by a pneumatic cylinder 311. The table consists of a base portion 312 and a cover portion 313 vertically slidable in the base portion and defining therewith a cavity in which a cushion 314 of resilient material is arranged. Admission of air to the cushion through the conduit 315 raises the cover portion 313 from the base portion 312.

A plate 316 in which electric heaters are embedded is interposed between the table 310 and the plunger 305, and is urged upwardly away from the cover portion 313 by compression springs 317 of which only one is seen in FIG. 6. It will be understood that additional heaters may be arranged in the jaws 306, 307. The side pressure members 308 and 309 are pivotally linked to the table 310 and to stationary guides (not shown) in such a manner as to move toward the mold when the table 310 is moved upward by the cylinder 311.

The sole attaching machine includes additional guide means and locking means for the several elements of the mold which further ensure proper working of the machine, but are not directly related to the instant invention. They are disclosed in detail in the cited patent.

As shown in FIG. 6, the sole attaching machine is in the inoperative position assumed for loading and unloading. The operator removes an assembled shoe from the presser foot 304, pulls a vamp over the presser foot and places a sole on the plunger 305. He then presses a push button, and the controls take over as will be described in more detail hereinafter. The presser foot is rotated 180° about the axis of the beam 301, and the table 310 is raised by the piston of the cylinder 311 until it abuts against the heater plate 316 while the side pressing members 308, 309 are moved inward of the mold to urge the jaws 306, 307 toward the foot 304. After the mold has been closed, air under pressure is admitted to the cushion 314 and presses the plunger 305 against the sole whereby the latter is sealed to the vamp under the influence of heat and pressure.

When sealing is completed, the afore-described steps of machine operation are reversed until the operating parts of the machine resume the positions illustrated in FIGS. 4 and 6. If the several work stations are mounted on a rotary support, they move away from the operator's position when the machine cycle starts, and return to that position when the cycle is completed and an assembled shoe is ready to be withdrawn.

The control device which causes the several steps of the machine operation to be performed in proper sequence will now be described with reference to the wiring diagram of FIGS. 1 to 3.

The sole attaching machine is connected to a three-phase electric line of 3×380 volts over a main switch 1 and to a neutral wire 2. The electric line is protected by main fuses 3, 4, 5 respectively arranged in each phase and provided with glow discharge tubes 6, 7 and 8 (FIG. 1).

The wires of the electric line lead to terminals 11 and 13 of a contactor 9 which controls the heaters of the machine. The third wire 52, which energizes the controls, leads from the fuse 5 to a switch 50 in the primary circuit of the heating contactor 9, further to a fuse 66 which protects the primary winding 68, 69 of a control transformer 67, to the secondary terminals 70, 71 of which there are connected the conductors 101, 102 (FIGS. 1, 2 and 3) and the extension conductors 121, 123 which directly or indirectly energize all other control devices (FIGS. 1, 2 and 3). A conductor 129 connects the third wire 52 to the contact 136 of a relay 130 (FIG. 1), to the contact 192 of a two-pole switch 190 (FIG. 2), and further to the contact 259 of a time relay 254 (FIG. 3).

Figure 1:
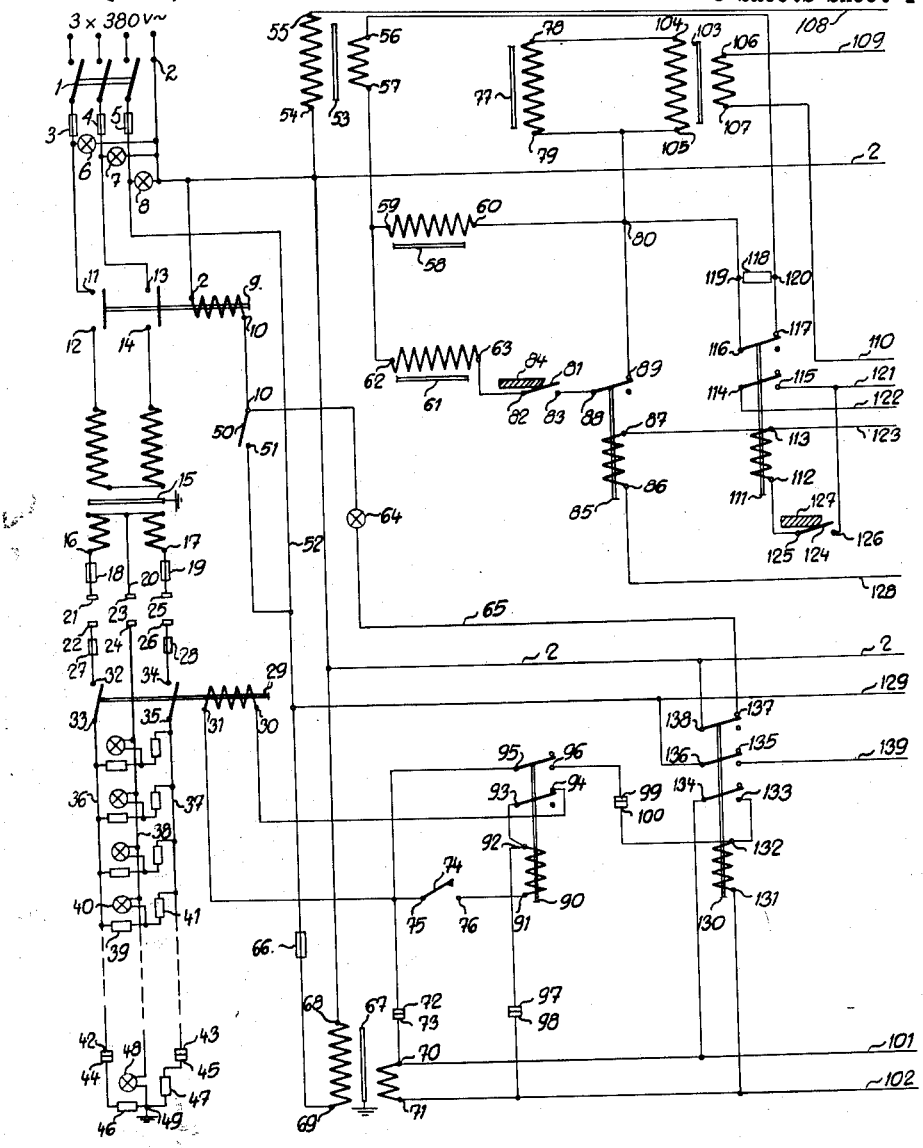
FIG. 1 shows a first part of the wiring diagram of the automatic control device.

When the switch 1 is closed, electric current flows to the primary winding of the transformer 67 (FIG. 1). The 24 volt output of the secondary transformer winding energizes a relay 29. One terminal 31 of the relay coil is connected over a ring 72 and a carbon brush 73 to the terminal 70 of the transformer 67 while the other coil terminal 30 is connected to the transformer terminal 71 over the closed contacts 94, 93 of a relay 90, the coil terminal 92 of the relay 90, the ring 97, and the carbon brush 98 (FIG. 1). The relay 29 controls the individual heaters of all mold elements. When the switch 1 is closed, the relay is energized and its terminals 32, 33, 34, 35 connect respective legs 36, 37 in the heating circuits of the mold to respective fuses 27 and 28, rings 21, 25 and carbon brushes 22, 26 to the main heating fuses 18, 19, and to the outer secondary terminals 16, 17 of a heating transformer 15, whose primary terminals are connected to contacts 12, 14 of the contactor 9 (FIG. 1). Current is returned from the several heaters to a center tap 20 of the transformer 15 by a conductor 38, a ring 23, and a carbon brush 24.

The heating of the machine stations is initiated by closing the switch 50. The voltage from the wire 52 is thereby applied over the switch contacts 51 and 10 to the coil of the contactor 9. The contacts 11, 12 and 13, 14 of the latter are closed and the heating transformer 15 is energized.

The heaters are distributed in pairs in the machine over the heating plate 316, the jaws 306, 307 and the presser foot 305. Each pair of heaters 39, 41 is arranged in series, and their junction is connected by a signal lamp 40 to the conductor 38. If a heater burns out or develops a short-circuit, the corresponding signal lamp lights up. A short-circuit in the heater has to be corrected immediately by disconnecting the respective heater, but a broken wire in the heater can be repaired after working time, because the loss in heat output is automatically compensated by a thermostatic switch 74 without significant effects on the duration of the machine cycle or the quality of the product.

Heating current is transmitted to the presser foot by a pair of rotary contacts 44, 45 which are insulated from the cross beam 301. The rotary contacts 44, 45 cooperate with stationary spring contacts 42, 43. The heaters 46, 47 are arranged in series in the heel and toe portions of the presser foot. Their junction is grounded to the frame 49 of the machine, and is connected through a signal lamp 48 to the conductor 38 (FIG. 1).

After the switch 50 has been closed by hand, a glow discharge tube 64 receives current from the switch terminal 10. The glow discharge tube is connected to the neutral wire 2 by a conductor 65 and contacts 137, 138 of the relay 130. Said glow discharge tube 64 therefore indicates whether the stations are heated.

The heating of the machine to its working temperature takes about 60 minutes. Heating is interrupted when the thermostatic switch 74 reaches the temperature which is desired for the mold. The contacts 75, 76 of the switch 74 close the circuit of the coil 91, 92 of the relay 90 over the collector brush 97 and ring 98. When the relay 90 is energized, the contacts 93, 94 are opened, the circuit of the coil of the relay 29 is interrupted, and the heating of the mold is discontinued because the contacts 32, 33 and 34, 35 are opened (FIG. 1).

The other contact pair 95, 96 of the relay 90 connects the control circuit from the terminal 70 of the transformer 67 over the ring 73 and the carbon brush 72 to the carbon brush 99 and the ring 100 to the primary terminal 132 of the relay 130, whose other terminal 131 is permanently connected to the conductor 102 and the terminal 71 of the transformer 67 (FIG. 1).

When the relay 130 is energized it continues drawing current over holding contacts 133, 134 which are connected by the conductor 101 to the transformer terminal 70.

When the temperature of the mold drops, the thermostatic switch 74 opens the circuit of the coil of the relay 90. The normally closed contacts 93, 94 energize the coil of the relay 29 and the contacts 32, 35 again feed heating current to the mold.

When the relay 130 is energized and held by its contacts 133, 134, power is supplied from the conductors 52 and 129 over the relay contacts 136 and 135 to a conductor 139 which feeds line voltage to the contact 148 of a relay 140 (FIG. 2) which controls all other operations of the machine.

The machine thus can be operated only after having been heated, which is important for the quality of the product.

Figure 2:
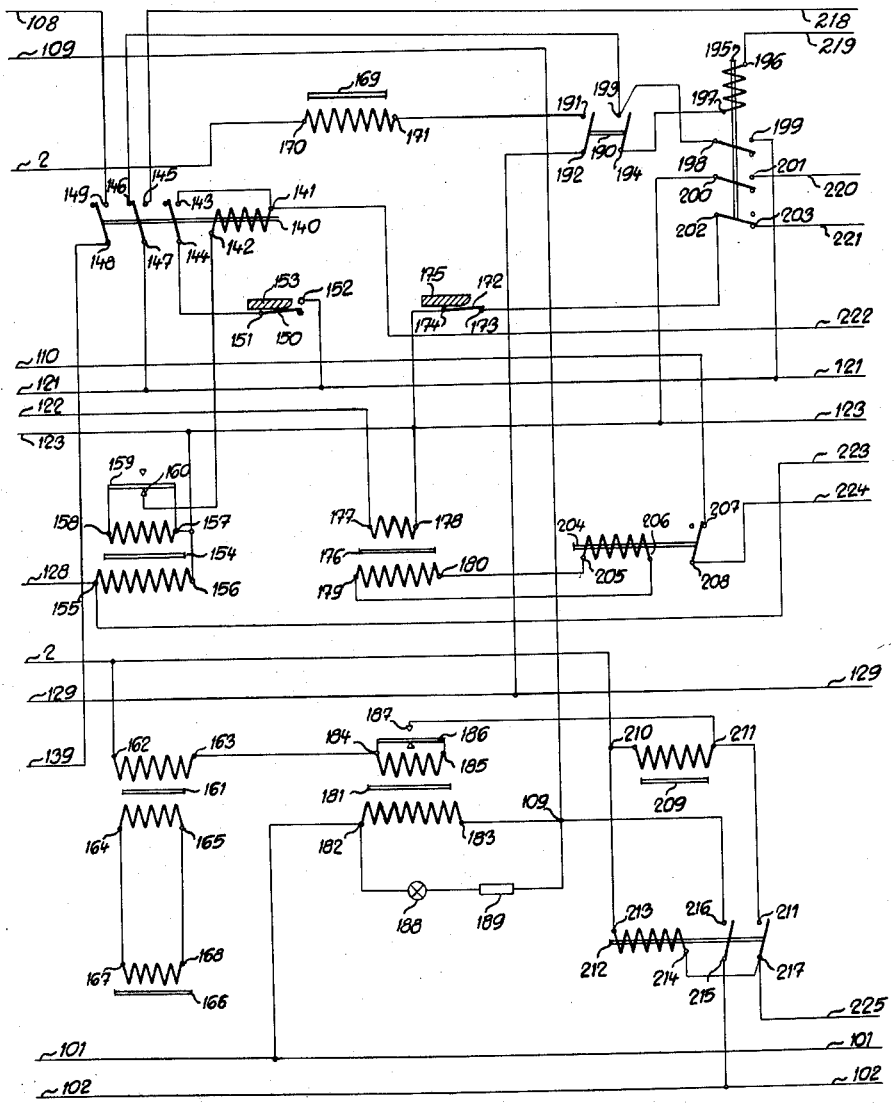
FIG. 2 is a continuation of the diagram shwn in FIG. 1.

The normally open contacts 138, 137 of the relay 130 interrupt the circuit of the glow discharge tube 64 (FIG. 1), thereby indicating that the machine is heated and ready for operation. The automatic movements of the sole attaching machine are actuated by the control device in the following way:

After the mold has been heated to the required temperature, automatic operation is initiated by the starting switch 190 (FIG. 2). When its contacts 192, 191 are closed, line voltage is brought from the conductor 129 to the terminals 171 and 170 of a solenoid air valve 169 in the main air supply, thus opening the supply of compressed air to the machine (FIG. 2). The valve 169 is normally closed and shuts off the air pressure in the machine upon a loss of voltage, irrespective of the operating position of the machine in order to prevent damage to any part of the machine. Closing of the second pair of contacts 194, 193 of the starting switch 190 supplies control voltage from the conductor 121 over the contacts 147, 146 of the relay 140 (FIG. 2) to the coil 197, 196 of the relay 195 (FIG. 2) and the circuit is completed by a conductor 219 over a contact 267 (FIG. 3), the extension conductor 123, and the conductor 101.

When the relay 195 (FIG. 2) is actuated, its holding contacts 198, 199 are closed, so that the coil 197, 196 receives voltage from the extension conductor 121 even if the contacts 146, 147 of the relay 140 are open. The third set of contacts 202, 203 of the relay 195 are breaking contacts for terminating a cycle, as will be explained hereinafter.

The second pair of contacts 200, 201 (FIG. 2) transmits control voltage from the conductor 123 through a conductor 220 to a primary terminal 235 of a transformer 234 (FIG. 3), the other primary terminal 236 of which is connected to the conductor 121. The terminals 237, 238 of the secondary winding of the transformer 234 are connected in parallel with the terminals 248, 249 of a time relay 247 (FIG. 3) which, for a total working cycle of eight minutes, is adjusted to forty seconds. The time relay 247 determines the period available for manipulation. During this manipulation period the operator fits a shoe upper or ramp on the divided presser foot 304 and places a suitably prepared sole on the heated plunger 305. After the manipulation period has elapsed, the time relay 247 is switched on, and its contacts 250, 251 transmit the voltage supplied by the transformer 234 to the terminals 256, 255 of a time relay 254 (FIG. 3), which starts to operate and is set to close its contacts after about seven seconds.

Figure 3:
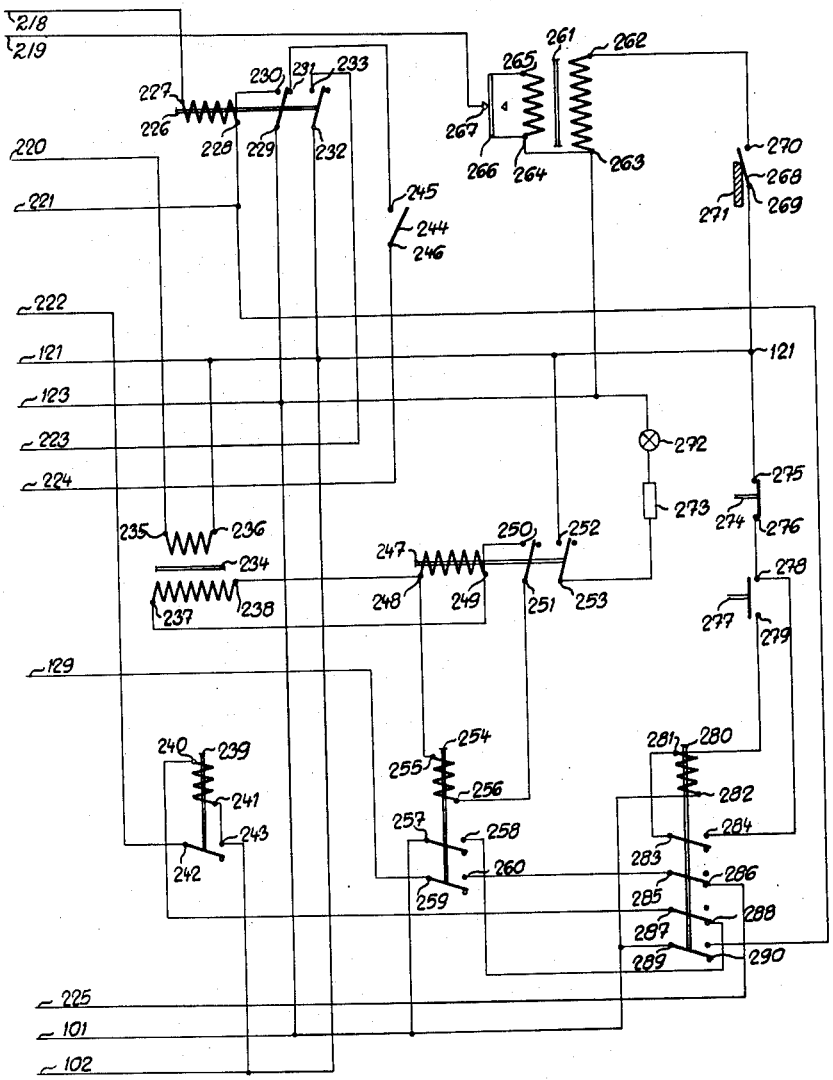
FIG. 3 is a third portion of the diagram partly shown in FIGS. 1 and 2.

The second pair of contacts 252, 253 of the time relay 247 supplies current from the conductor 121 through a resistor 273 to a signal lamp 270 which lights up and signals that the rotation of the presser foot will take place shortly (FIG. 3).

After the set delay has elapsed, the time relay 254 is energized and its two pairs of normally open contacts 257, 258 and 259, 260 are closed (FIG. 3).

By the first pair of contacts 257, 258, control voltage is supplied from the conductor 101 over normally closed contacts 288, 287 of the relay 280 to the primary terminals 240, 241 of a relay 239 (FIG. 3). The resulting closing of the contacts 243, 242 of the relay 239 causes current to be supplied by the conductor 222 from the conductor 102 to the primary terminal 141 of a pulse relay 140 (FIG. 2). The other primary terminal 142 of the relay 140 is connected through the contacts 160, 159, 158, 157 of a short-period bimetal time relay 154 (FIG. 2) to the extension conductor 123.

The relay 140 closes three contact pairs when energized. The first pair 143, 144 closes a holding circuit supplied with power from the conductor 121 over closed contacts 152, 151 of a quick-break switch 150 (FIG. 2) and connected to one terminal 141 of the coil of the relay 140. The holding circuit is not closed as long as the contacts 151, 152 are held open by a cam 153. The coil 142, 141 of the relay 140 is therefore initially maintained under voltage directly from the relay 239 (FIG. 3).

The second pair of contacts 147, 145 feeds voltage from the conductor 121 to the primary terminals 227, 228 of the relay 226 (FIG. 3), and the circuit continues over a conductor 221 to the contact 203 of the relay 195 (FIG. 2). The circuit is broken, when the relay 195 is energized. By the opening of the contacts 147, 146 current is prevented from passing from the conductor 121 through the contacts 193, 194 to the terminal 197 of the relay coil 195, but the coil of the relay 195 is under voltage from the holding circuit which extends from the conductor 121 through the contacts 199, 198, 193, 194, 197. The third contact pair 148, 149 of the relay 140 closes a circuit leading from the conductor 129 over the conductor 139, closed contacts 136, 135 of the relay 130 (FIG. 1), and the conductor 108 to one of the primary terminals 55, 54 of a transformer 53, to the secondary terminal 57 of which respective terminals 59 and 62 of two solenoid valves 58 and 61 are connected (FIG. 1).

The solenoid valve 58 receives current immediately, as the secondary transformer terminal 56 is connected by the closed contacts 117, 116 of a relay 111 (FIG. 1) and a conductor 80 to the terminal 60 of the solenoid valve 58. This valve admits compressed air to a pneumatic cylinder which rotates the presser foot 304 of the machine of FIG. 4 to the operative position. The cam 153 moves with the rotation of the foot, and the movement of the cam 153 (FIG. 2) permits first the holding circuit of the relay 140 to be closed by the quick break switch 150, but soon afterwards a similar movement of a cam 84 closes the circuit of the solenoid valve 61 from the terminal 63 to the conductor 80 by way of a second quick break switch 81 having contacts 82, 83. The solenoid valve 61 controls the supply of compressed air to the cylinder 311 for closing the mold of the sole attaching station.

When the solenoid valve 61 is energized, the plunger 305 is raised and the jaws 306, 307, are moved toward each other so that the mold is closed about the foot 304. A cam 127 serves to close the contacts 125, 126 of a quick break switch 124 (FIG. 1), when the side pressure members complete their mold closing movement, so that a circuit from the conductor 121 to the terminal 112 of the relay 111, and from the second relay terminal 113 to the conductor 123 is closed.

The relay 111 is provided with two sets of contacts. The normally closed contacts 116, 117 are arranged in parallel with the terminals 119, 120 of a resistor 118, which is short-circuited by the closed contacts 116, 117. When the relay 111 is energized, the resistor 118 is inserted in series into the circuits of both solenoid control valves 58, 61.

The normally open contacts 114, 115 are interposed between the conductor 121 and a conductor 122 which leads to one of the primary terminals 177 of a transformer 176, to the secondary terminals 179, 180 of which the terminals 205, 206 of a time relay 204 (FIG. 2) are connected. The relay 204 is set for a delay of about eight seconds. The relay 204 blocks the supply of compressed air to the air cushion 314 of the machine until the station is turned by about 30° away from the operator's position during its circular movement. Simultaneously with this process, the time relay 254 (FIG. 3) is in operation, one contact pair 257, 258 of which causes the movement of the presser foot 304, side pressure members 308, 309 and of the heated plunger 305, as described above.

By means of the second contact pair 259, 260 of the relay 254, a further time relay 212 (FIG. 2) is actuated, which during further rotation of the station causes the following operations: Line voltage is fed over the contact pair 259, 260 of the time relay 254 from the conductor 129 over the contacts 285, 286 of the relay 280 (FIG. 3), and a conductor 225 to the contact 217 and the primary terminal 214 of the time relay 212, and from the other primary terminal 213 to the neutral wire 2. The time relay 212 defines the time until the signal lamp 188 indicating the displacement of the pressing station is lit and is set for about four seconds. The total time to which the time relay 212 is set, including the time to which the bimetal relay 181 is set, must be shorter than the adjusted closing time of the time relay 204 as the air cushion 314 must be kept filled with compressed air for a longer period extending during the further rotation of the station. The relay 181 will be presently referred to in more detail.

After its set delay has elapsed, the time relay 212 closes two circuits, in the first of which control voltage is fed over contacts 215, 216 from the conductor 102 to the conductor 109, to the series resistor 189 and the signal lamp 188, and hence over the terminal 182 of the bimetal relay 181 to the conductor 101. From the contact 216 control voltage is also fed through the conductor 109 to the primary terminal 106 of a transformer 103 (FIG. 1), whose secondary winding 104, 105 is in circuit with the coil 78, 79 of a solenoid valve 77 which admits compressed air to the cushion 314. The primary circuit of the transformer 103 continues from a second primary terminal 107 through a conductor 110 over normally closed contacts 207, 208 of a time relay 204 (FIG. 2) to a conductor 224 and a terminal 246 of a switch 244 which thus controls the air supply to the cushion 314, and by means of which pressure may be released from the cushion after the operation of the machine is terminated, or for testing the machine. The primary circuit of the transformer 103 further extends to contacts 231, 229 of a relay 226 and to the conductor 101.

After the time relay 212 has been actuated, the second contact pair 217, 218 immediately feeds line voltage to terminal 211 of a solenoid valve 209, which releases compressed air from the cylinder 311 controlling movement of the mold walls of the machine, permitting thus the mold members to be separated. The release of the pressure locking the mold walls thus precedes the displacement of the station which is delayed by the bimetal relay 181.

Control voltage is fed from the contact 216 through the conductor 109 and from the conductor 101 to respective primary terminals 183, 182 of the bimetal time relay 181 (FIG. 2) the secondary winding 184, 185 of which heats a bimetal spring 186. After a predetermined time delay the spring 186 touches a contact 187 and closes a line current circuit from the neutral wire 2 over primary terminals 162, 163 of a transformer 161 (FIG. 2), the contacts 184, 187, the contacts 218, 217 of the time relay 212, the conductor 225, to the normally closed contacts 286, 285 of the relay 280 (FIG. 3), and from there to the closed contacts 260, 259 of the time relay 254 (FIG. 3) and further to the line voltage conductor 129.

When the last-mentioned circuit is closed, voltage is fed to the transformer 161 (FIG. 2), to the secondary terminals 164, 165 of which the electromagnetic valve 166 (FIG. 2) is connected by its coil terminals 167, 168. The valve 166 controls the supply of compressed air to the cylinder actuating the rotary indexing movement of the work stations. While the work station travels, the time relay 204 is actuated. Opening of its contacts 207, 208 breaks the primary circuit of the transformer 103 which controls the solenoid valve 77.

Shifting of the valve 77 causes compressed air to be released from the cushion 314.

When the cylinder actuating the rotary displacement of the station reaches its end position, a cam 271 (FIG. 3) closes a quick break switch 268. Its contacts 269, 270 apply control voltage from the conductor 102 to the primary terminal 262 of the bimetal time delay relay 261 (FIG. 3), the other primary terminal 263 of which is connected to the conductor 101. After the bimetal strip 266 between the secondary terminals 264, 265 of the relay has been heated and the set time has elapsed, a contact 267 is opened and the circuit of the relay coil 195 (FIG. 2) is interrupted. The relay 195 is deenergized and the other time relays 247, 254, 212 are shut off together with the associated relays and other devices, with the exception of the relays 111 (FIG. 1), 140 (FIG. 2), which keep the mold closed.

Shutting off of the relay 195 deenergizes the electromagnetic valve 166 which controls the displacement of the work station. The piston in the displacement cylinder is returned to its inoperative position. During this return movement a cam 175 (FIG. 2) causes a quick break switch 172 to close. Its contacts 174, 173 feed control voltage from the conductor 123 over the newly closed contacts 202, 203 of the relay 195 to the coil terminals 228, 227 of the relay 226 (FIG. 3), which is thereby switched on. The primary circuit of the relay 226 is completed by the conductor 218, the contacts 145, 147 of the still energized relay 140 (FIG. 2) and the extension conductor 121.

The relay 226 having been closed is held in the closed condition by a circuit including the contacts 230, 229 and the conductor 123. The contacts 232, 233 close two circuits one of which leads from the control voltage conductor 121 over a conductor 223 to the primary terminals 155, 156 of the bimetal time delay relay 154 (FIG. 2), which starts to operate. The other circuit starts from the terminal 155, and leads over a conductor 128 to the coil terminals 86, 87 of a relay 85 (FIG. 1). The circuit is closed by a connection from the terminal 87 to the conductor 123.

The contacts 88, 89 of the relay 85 open and close the circuit of the solenoid valve 61 in the pressure fluid circuit of the cylinder 311. Opening of the contacts 88, 89 upon actuation of relay 85 causes return of the jaws 306, 307 to their basic position together with the plunger 305.

The presser foot 304 is returned to its initial position when the time relay 154 is deenergized. The relay must bet set for a longer period than the time of opening the jaws 306, 307 after the relay 85 has been actuated. The secondary circuit (157, 158) of the relay 154 is connected by means of a bimetal strip 159 with the contact 160. As soon as the mold jaws have been opened, the bimetal strip snaps back and breaks the energizing circuit of the relay 140.

When current is shut off from the relay 140, its contacts 148, 149 are opened and the supply of line voltage over the conductors 139 and 108 to the terminals 55, 54 of the transformer 53 (FIG. 1) is broken. The valve 58 is deenergized and the presser foot is returned to its inoperative position for manual operations. The quick break switches 81, 124 are opened by the rotation of the beam 301 and the quick break switch 150 (FIG. 2) is closed. The switch 124 breaks then the circuit to the terminals 112, 113 of the relay 111, which is deactivated.

When the relay 140 is shut off, current from the conductor 121 is fed over contacts 147, 146 and the closed contacts 193, 194 of the switch 190 (FIG. 2) to the coil 197, 196 of the relay 195 (FIG. 2), which is conductively connected to the conductor 219. The relay 195 is thereby switched on again and the entire cycle is automatically repeated.

The afore-described control device as illustrated in FIGS. 1 to 3 permits a rubber sole to be vulcanized automatically to a shoe upper by means of the machine shown in FIGS. 4 to 6.

The work station may be stopped in any position, and even before the jaws 306, 307 are closed, and the plunger 305 is raised, or during the displacement of the station. A "Stop" push-button 277 (FIG. 3) is arranged within the operator's easy reach, as mentioned above. Its contacts 278, 279 connect the coil 281, 282 of the relay 280 (FIG. 3) to the conductor 101. When the relay 280 is energized, it holds itself by means of its closed contacts 283, 284. Its contacts 289, 290 feed control voltage from the conductor 101 to the coil terminals 228, 227 of the relay 226 (FIG. 3), which is thereby actuated so that its contacts 232, 233 are closed, current is passed through the conductor 223 to the terminals 155, 156 of the time relay 154 (FIG. 2) and also through the conductor 128 to the terminals 86, 87 of the relay 85 (FIG. 1). The contacts 88, 89 of the latter deenergize the solenoid valve 61, and the mold walls are opened.

With the time lag caused by the time relay 154, the circuit of the coil 142, 141 of the relay 140 (FIG. 2) is also broken, causing the circuit of the transformer 53 to be interrupted at the contacts 148, 149. The solenoid valve 58 is deenergized and permits the presser foot to be turned to its inoperative position. The automatic sequence of operations is interrupted. Work is continued by pressing the push-button 274 "Continue." Its normally closed contacts 275, 276 break the holding circuit of the relay 280 (FIG. 3) and the automatically controlled operation resumes with the same steps as prior to the interruption.

If the "Stop" button 277 is pressed while the station is being displaced the normally closed contacts 285, 286 of the relay 280 are opened, which interrupts the circuit of the coil 214, 213 of the time relay 212 which controls the displacement of the work station (FIG. 2), while the previously closed time relays 254 and 247 (FIG. 3) remain in closed position. When the push-button 274 "Continue" is then pressed, the relay 280 (FIG. 3) is deenergized, and the displacement of the station is resumed after a time interval.

When operations are interrupted by pressing the "Stop" button, the additional pair of normally closed contacts 287, 288 of the relay 280 deenergizes the relay 239 (FIG. 3) and thereby blocks the conductor 222 in the primary circuit of the relay 140 (FIG. 2), which would otherwise automatically close the mold as soon as the deenergized relay 154 releases its armature. The push-buttons 277 and 274 are used by the operator, if prior to closing of the mold the inserted material has to be adjusted on the plunger 305, or if the operator has not prepared further material in time, or because of other difficulties, or when the station is to be displaced, adjusted or the like.

One of the features of the invention is the possibility of automatic control of a plurality of stations arranged in series, which results in a substantial increase in productivity, accuracy of the product as well as its quality. All operative steps of the individual stations and thereby also of all stations belonging to one unit are entirely automatic from the moment of starting the machine to its stopping.

It is a further advantage of the present invention that the cycle timing can be adjusted as desired for the several operations of the several stations which jointly constitute a unit according to the requirements of the process to be carried out.

A particular feature is the advantageous arrangement of the heaters in the heated elements of each mold. If an electric heater fails, the output of the affected station or of the machine is not impaired.

A further advantage is the arrangement of signalling means which indicate every failure of a heater in the several stations of a unit.

It will be appreciated that the control device described for the purpose of the disclosure is not limited to the equipment disclosed in Patent No. 2,987,738 but that its field of application extends to many types of machinery including a plurality of independently movable mechanisms.

I claim:

1. In a machine for attaching shoe soles to uppers by heat and pressure, in combination, a mold including a presser foot member, a plunger member, and two jaw members, said members being each movable toward and away from an operative position in which said plunger member and said jaw members define a substantially closed mold cavity about said presser foot member; electric heater means arranged on at least one of said members; first actuating means for actuating movement of said presser foot member toward and away from said operative position thereof; second actuating means for actuating joint movement of said plunger member and of said jaw members toward and away from said operative position thereof; first and second electrical control means for respectively controlling said first and second actuating means; third control means for controlling flow of electric current to said heater means; and first circuit means interconnecting said control means for preventing actuation of movement of said members by said actuating means until said one member has been heated to a predetermined temperature by said heater means.

2. In a machine as set forth in claim 1, pressure cushion means interposed between said plunger member and said presser foot member in the operative position of the same; cushion actuating means for expanding said cushion means in a direction toward said presser foot member; and fourth electrical control means for controlling expansion of said cushion means by said cushion actuating means.

3. In a machine as set forth in claim 2, starter means; and second circuit means interconnecting said first, second, third and fourth control means and said starter means for actuating said first, second, third and fourth control means in a predetermined sequence when said starter means is actuated.

4. In a machine as set forth in claim 3; stop means; third circuit means interconnecting said stop means with said first and second control means to cause the related actuating means to move the presser foot member and the plunger and jaw member away from their operative position upon actuation of said stop means at any point in said predetermined sequence; and restart means connected with said third circuit means and operative, upon being actuated, to cause the restoration of said first and second control means to the conditions thereof at the time of the previous actuation of said stop means.

References Cited in the file of this patent

UNITED STATES PATENTS

| | | |
|---|---|---|
| 2,321,130 | Crandell | June 8, 1943 |
| 2,619,661 | Hart | Dec. 2, 1952 |
| 2,987,738 | Novotny et al. | June 13, 1961 |